(12) United States Patent
Meyer

(10) Patent No.: US 6,700,902 B1
(45) Date of Patent: Mar. 2, 2004

(54) METHOD AND SYSTEM FOR IMPROVING WIRELESS DATA PACKET DELIVERY

(75) Inventor: Peter Ronald Meyer, Apex, NC (US)

(73) Assignee: Elster Electricity, LLC, Raleigh, NC (US)

( * ) Notice: Subject to any disclaimer, the term of this patent is extended or adjusted under 35 U.S.C. 154(b) by 0 days.

(21) Appl. No.: 09/174,720

(22) Filed: Oct. 19, 1998

(51) Int. Cl.[7] .............................. H04J 3/22; H04J 3/16
(52) U.S. Cl. .................. 370/468; 370/329; 370/437
(58) Field of Search ........................... 370/229, 230, 370/234, 235, 310.2, 329, 332, 333, 335, 336, 338, 342, 345, 328, 341, 376, 382, 383, 395.7, 413, 415, 417, 431, 437, 436, 468

(56) References Cited

U.S. PATENT DOCUMENTS

| | | |
|---|---|---|
| 3,445,815 A | 5/1969 | Saltzberg et al. ............ 340/163 |
| 3,858,212 A | 12/1974 | Tompkins et al. ..... 343/100 CS |
| 3,878,512 A | 4/1975 | Kobayashi et al. ..... 340/168 R |
| 3,973,240 A | 8/1976 | Fong .......................... 340/151 |
| 4,031,513 A | 6/1977 | Simciak ................... 340/152 T |
| 4,056,107 A | 11/1977 | Todd et al. ................. 130/27 R |
| 4,132,981 A | 1/1979 | White .......................... 340/203 |
| 4,190,800 A | 2/1980 | Kelly, Jr. et al. .............. 325/37 |
| 4,204,195 A | 5/1980 | Bogacki ...................... 340/151 |
| 4,218,737 A | 8/1980 | Buscher et al. .............. 364/493 |
| 4,250,489 A | 2/1981 | Dudash et al. ............ 340/147 T |
| 4,254,472 A | 3/1981 | Juengel et al. ............... 364/900 |
| 4,319,358 A | 3/1982 | Sepp ............................. 375/1 |
| 4,321,582 A | 3/1982 | Banghart ................ 340/310 R |
| 4,361,890 A | 11/1982 | Green, Jr. et al. .............. 375/1 |
| 4,405,829 A | 9/1983 | Rivest et al. ............. 178/22.14 |
| 4,415,896 A | 11/1983 | Allgood ................. 340/870.03 |
| 4,466,001 A | 8/1984 | Moore et al. .......... 340/825.08 |
| 4,504,831 A | 3/1985 | Jahr et al. .............. 340/870.03 |
| 4,506,386 A | 3/1985 | Ichikawa et al. ........... 455/343 |
| 4,525,861 A | 7/1985 | Freeburg ...................... 455/33 |
| 4,600,923 A | 7/1986 | Hicks et al. ........... 340/870.02 |
| 4,608,699 A | 8/1986 | Batlivala et al. ............. 375/216 |
| 4,611,333 A | 9/1986 | McCallister et al. ........... 375/1 |
| 4,614,945 A | 9/1986 | Brunius et al. ........ 340/870.02 |
| 4,617,566 A | 10/1986 | Diamond ............... 340/870.11 |
| 4,628,313 A | 12/1986 | Gombrich et al. ..... 340/870.02 |
| 4,631,538 A | 12/1986 | Carreno .................. 340/870.18 |
| 4,638,298 A | 1/1987 | Spiro ......................... 340/827 |
| 4,644,321 A | 2/1987 | Kennon .................. 340/310 A |
| 4,653,076 A | 3/1987 | Jerrim et al. ................ 375/115 |

(List continued on next page.)

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |

(List continued on next page.)

OTHER PUBLICATIONS

Rappaport, Theodore S., "Wireless Communications, Principles and Practice," Prentice Hall PTR, 1996, pp. 410–413.
Internet Printout, http://www.ardis.com. "Ardis Two–Way, Wireless Data Communication," ARDIS, Sep. 23, 1998.

(List continued on next page.)

Primary Examiner—Phirin Sam
(74) Attorney, Agent, or Firm—Woodcock Washburn LLP

(57) ABSTRACT

A system and method for improving the delivery of data between a first signal transmitter/receiver device and a second signal transmitter/receiver device. Data is dynamically sized into at least one data packet having a data packet size that is no greater than an operational maximum data packet size capable of being transferred between the first wireless signal transmitter/receiver device and the second wireless signal transmitter/receiver device. At least one data packet is transferred from the first signal transmitter/receiver device to the second signal transmitter/receiver device until all data has been delivered.

38 Claims, 5 Drawing Sheets

U.S. PATENT DOCUMENTS

| | | | |
|---|---|---|---|
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825.01 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,827,514 A | 5/1989 | Ziolko et al. | 380/48 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,086,292 A | 2/1992 | Johnson et al. | 340/637 |
| 5,090,024 A | 2/1992 | Vander Mey et al. | 375/1 |
| 5,111,479 A | 5/1992 | Akazawa | 375/1 |
| 5,115,448 A | 5/1992 | Mori | 375/1 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,307,349 A | 4/1994 | Shloss et al. | 370/85.2 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,522,044 A | 5/1996 | Pascucci et al. | 395/200.06 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,572,438 A | 11/1996 | Ehlers et al. | 364/492 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,619,685 A | 4/1997 | Schiavone | 395/500 |
| 5,621,629 A | 4/1997 | Hemminger et al. | 363/56 |
| 5,627,759 A | 5/1997 | Bearden et al. | 364/483 |
| 5,631,636 A | 5/1997 | Bane | 340/825.69 |
| 5,640,679 A | 6/1997 | Lundqvist et al. | 455/33.2 |
| 5,659,300 A | 8/1997 | Dresselhuys et al. | 340/870.02 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,699,276 A | 12/1997 | Roos | 364/514 A |
| 5,715,390 A | 2/1998 | Hoffman et al. | 395/188.01 |
| 5,717,604 A | 2/1998 | Wiggins | 364/514 C |
| 5,745,901 A | 4/1998 | Entner et al. | 364/103 |
| 5,748,104 A | 5/1998 | Argyroudis et al. | 340/870.11 |

| | | | |
|---|---|---|---|
| 5,751,914 A | 5/1998 | Coley et al. ................... 395/51 |
| 5,751,961 A | 5/1998 | Smyk ..................... 395/200.47 |
| 5,754,772 A | 5/1998 | Leaf ....................... 395/200.33 |
| 5,754,830 A | 5/1998 | Butts et al. .................. 395/500 |
| 5,778,368 A | 7/1998 | Hogan et al. .................. 707/10 |
| 5,787,437 A | 7/1998 | Potterveld et al. .......... 707/103 |
| 5,790,789 A | 8/1998 | Suarez .................. 395/200.32 |
| 5,790,809 A | 8/1998 | Holmes ................. 395/200.58 |
| 5,805,712 A | 9/1998 | Davis .......................... 380/50 |
| 5,808,558 A | 9/1998 | Meek et al. ........... 340/870.01 |
| 5,822,521 A | 10/1998 | Gartner et al. ............ 395/200.6 |
| 5,862,391 A | 1/1999 | Salas et al. ............ 395/750.01 |
| 5,872,774 A | 2/1999 | Wheatley, III et al. ..... 370/335 |
| 5,874,903 A | 2/1999 | Shuey et al. ........... 340/870.02 |
| 5,875,183 A | 2/1999 | Nitadori ..................... 370/328 |
| 5,875,402 A | 2/1999 | Yamawaki .................. 455/502 |
| 5,897,607 A | 4/1999 | Jenney et al. ................. 702/62 |
| 5,898,387 A | 4/1999 | Davis et al. ........... 340/870.02 |
| 5,910,799 A | 6/1999 | Carpenter et al. .......... 345/333 |
| 5,943,375 A | 8/1999 | Veintimilla ................. 375/355 |
| 5,963,146 A | 10/1999 | Johnson et al. ........ 340/870.01 |
| 5,970,062 A * | 10/1999 | Bauchot ................. 370/310.2 |
| 6,000,034 A | 12/1999 | Lightbody et al. .......... 713/202 |
| 6,041,056 A | 3/2000 | Bigham et al. ............. 370/395 |
| 6,067,029 A | 5/2000 | Durston ................ 340/870.03 |
| 6,073,174 A | 6/2000 | Montgomerie et al. ..... 709/224 |
| 6,078,251 A | 6/2000 | Landt et al. ............ 340/10.41 |
| 6,078,909 A | 6/2000 | Knutson ..................... 705/59 |
| 6,088,659 A | 7/2000 | Kelley et al. ................. 702/62 |
| 6,100,817 A | 8/2000 | Mason, Jr. et al. ..... 340/870.02 |
| 6,112,192 A | 8/2000 | Capek .......................... 705/59 |
| 6,150,955 A | 11/2000 | Tracy et al. ............ 340/870.02 |
| 6,160,993 A | 12/2000 | Wilson ...................... 455/12.1 |
| 6,172,616 B1 | 1/2001 | Johnson et al. ........ 340/870.12 |
| 6,199,068 B1 | 3/2001 | Carpenter ................... 707/100 |
| 6,236,647 B1 * | 5/2001 | Amalfitano ................. 370/335 |
| 6,246,677 B1 | 6/2001 | Nap et al. ................... 370/346 |
| 6,388,999 B1 * | 5/2002 | Gorsuch et al. ............ 370/335 |
| 6,405,254 B1 * | 6/2002 | Hadland ..................... 709/230 |

FOREIGN PATENT DOCUMENTS

| | | | |
|---|---|---|---|
| GB | 2 118 340 A | 10/1983 |
| GB | 2 157 448 A | 10/1985 |
| GB | 2 186 404 A | 8/1987 |
| GB | 2 222 898 A1 | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Internet Printout, http://www.ram.com BellSouth Wireless Data—Paging, Mobitex, Network, Business, Sep. 23, 1998: MOBITEX®: The Heart of Every BellSouth Solution, MOBITEX Features and Services: RAM Mobile Data White Paper, Feb. 1997, Narrowband PCS Technologies: What are the Options?: RAM Mobile Data White Paper, Nov. 1997, The Inherent Security of Data Over Mobitex Wireless Packet Data Networks, A RAM Mobile Data White Paper, Oct. 1995, Comparative Analysis of Coverage and Performance: RAM & Ardis, 1998.

Internet Printout, http://www.ardis.com/RADIO "An Overview of Radio Coverage"; Sep. 29, 1998, "Radio Propagation"; Sep. 29, 1998, "Factors Affecting ARDIS Coverage"; Sep. 29, 1998, "The ARDIS Network Compared to Other Systems" Sep. 29, 1998.

Internet Printout, http://www.ardis.com/RADIO "Radio Coverage," Sep. 29, 1998, "Glossary of Terms" Sep. 29, 1998, "Radio Propagation in Free Space," Sep. 29, 1998, "Real World Propagation Variations," Sep. 29, 1998, "Probability of Reception vs. Calculation" Sep. 29, 1998.

Desbonnet, J. et al., "System Architecture and Implementation of a CEBus/Internet Gateway," *IEEE Transactions on Consumer Electronics*, 1997, 43(4), 1057–1062.

International Search Report issued in International Application No. PCT/US98/11170 Date of Mailing: Oct. 7, 1998.

International Search Report issued in International Application No. PCT/US98/19034 Dated of Mailing: Feb. 1, 1999.

Markwalter, B. E. et al., "CEBus Network Layer Description," *IEEE Transactions on Consumer Electronics*, Aug. 1989, 35(3), 571–576.

"MV–90 Read Only System" UTS Software Solutions For Utility Customers. (No Date). (No Page Numbers or Pages).

Newton, H., *Newton's Telecom Dictionary*, CMP Books, 17$^{th}$ Ed., 2001, pp.: LAN (p. 394); CEBUS (p. 134).

\* cited by examiner

METHOD AND SYSTEM FOR IMPROVING WIRELESS DATA PACKET DELIVERY

FIELD OF THE INVENTION

This invention relates generally to communications, and more particularly, to a method for improving data package delivery of wireless communications through dynamic packet sizing.

BACKGROUND OF THE INVENTION

With the acceptance of wireless communications as a safe and reliable means by which to transfer data, more and more applications are being developed to support this need. These applications can be broadly divided up into two categories, mobile and telemetry.

Mobile devices are those devices where the end device is mobile, such as cellular phones, pagers, and Personal Digital Assistants (PDAs). Telemetry devices are those devices that are in a fixed point, such as an alarm sensor, or a remote meter reading device. Typically, mobile devices are usually operated by a human and are being moved around (such as a device mounted to a vehicle), while telemetry devices are usually unmanned and are fixed.

Wireless DataPacket (WDP) networks, such as ARDIS (Advanced Radio Data Information Systems) and BellSouth Wireless Data's Mobitex (formerly known as RAM Mobile Data), transfer data between a first device (hereinafter also referred to as tower, base station, or carrier device) and a second device (hereinafter also referred to as remote, modem, or end user device) using data packets. These traditional wireless systems use a fixed packet size to transfer data.

Packets are typically sent using a digital modulation scheme with built in error correction. This error correction is necessary due to the nature of radio frequency (RF) and the effects that the atmosphere has on the signals. When a device receives a data packet, the device will decode the message, using the inverse of the modulation scheme and then calculate a Bit Error Rate (BER), which is a measure of the number of bits that are in error inside the packet. If the BER is low enough, the device can fix the errors in the packet, thus making the packet useable. If the BER is too high, the method of error correction cannot guarantee correct data, thus rendering the packet unusable, forcing it to be discarded. Several negative impacts result if correct data cannot be guaranteed, including negative impacts on the network carrier only, on the application only, and on both the network carrier and the application. Some carriers only bill the customer on "delivered" packets, meaning correct packets. So, if a packet must be discarded by either the end user device or the tower device, the network carrier cannot bill the customer for that data, thus resulting in a loss of revenue for the carrier.

A negative impact on the end user device is that the information that it was trying to send was not correctly delivered to the tower device, thus requiring it to re-try the transmission of the packet. This is time consuming and unproductive for the end user. If none of the re-tries are successful, then the end user device is not able to get the information to the tower, rendering the application useless. Also, some carriers bill customers for all packets, whether the packets are delivered or discarded, thereby resulting in a higher bill to the customer. A negative impact on both the carrier and the application comes from areas that have highly congested packet traffic. As the traffic increases, the probability of the packet correctly reaching its destination is reduced. It can be shown that the throughput, T, of a pure ALOHA scheme, is $T=Re^{-2R}$ where $R=\lambda\tau$, $\lambda$ is the mean arrival time in packets per second (assuming a Poisson distribution) and T is the average duration of the packet, as described in "Wireless Communications, Principles and Practice," Theodore S. Rappaport, published by Prentice Hall PTR, © 1996, pg. 412. This shows that as the average number of packets is increased or the average duration of the packets is increased, the throughput of the system is decreased. This results in an increased number of packet collisions, which causes the packets to be undeliverable, leading to un-billable revenue activity by the network carrier and a failure of the application for the end user.

A wireless communications system or radio system generates a radio frequency signal that contains information. The system propagates or transmits that signal through the atmosphere with enough strength to be received at the appropriate location. The system preferably performs this function with a high degree of reliability under many different conditions.

Radio signal reception may best be described in terms of probabilities. It is difficult to calculate the actual signal level and effective receiver sensitivity with absolute certainty due to the fluctuations of both signal and noise levels caused by signal reflections. However, it is possible to predict a radio coverage area with a relatively high degree of accuracy.

As shown in FIG. 1, when radio signals operate in an environment free of obstructions (free space), their behavior may be predicted by subtracting radio signal losses from gains. Gains enhance or increase signal strength while losses attenuate or reduce that strength. The signal's gains minus its losses will determine whether the signal is strong enough for a receiver to recognize the signal.

To determine radio propagation performance in free space, the following gain and loss factors may be considered. Gains that are of most importance are transmitter output power/receiver sensitivity and the transmitter antenna. The RF transmitter is the source of power used by the system. A typical RF network fixed transmitters may operate with about 45 watts of power. A typical subscriber unit device may operate with about ¾ to one watt of power. This discrepancy is offset by the performance of the receivers and the topology of the area of operation. Base station receivers are typically more sensitive and selective (i.e., they "hear better") than the receivers in subscriber devices.

With regards to the transmitter antenna, a base station antenna converts an electrical signal to an electromagnetic wave that radiates through the atmosphere. Subscriber units detect these waves and translate them back to the original message sent by the host computer. Most antennas radiate electromagnetic waves evenly in all directions. Accordingly, for a typical ground-based system, waves radiate up into the sky and are wasted. For this reason, most networks use antennas that concentrate the radiated signal in the desired directions by reducing signals radiated above the horizon.

Some of the losses that are important in determining radio propagation performance in free space are the transmission line, the free space attenuation, and the subscriber unit antenna. With respect to the transmission line, a typical network's transmitter/receivers are connected to base station antennas by a transmission line. This line has a loss associated with it that is proportional to its length. Losses associated with free space attenuation result when an electromagnetic wave travels unobstructed through the atmosphere, it loses its power in proportion to the distance that it travels. Several factors cause this attenuation. First, the atmosphere offers resistance to the signal and lowers its strength. Second, as the wave radiates outward, the area it covers increases. Subsequently, the wave's radiated energy must cover a larger area causing the signal strength to decrease at any particular point. Another loss factor to consider is losses associated with the subscriber unit antenna. Subscriber units typically have internal antennas. For an antenna to provide a gain, or at least have no loss, it must have a certain characteristic length and remain unobstructed by any metallic objects. These features are much easier to design into an exterior antenna. However, an exterior antenna may reduce user convenience by limiting mobility.

Accordingly, in free space, a received signal level can be easily calculated by factoring together gains and losses. If the received signal level is greater than the minimum sensitivity of the receiver, communication will generally occur successfully.

Wireless communications or radio wave communications in the real world are significantly different from the free space propagation model discussed above. In fact, almost all real world factors negatively affect propagation. Although people have been exposed to the use of radio propagation through television and commercial radio all of their lives, there is a considerable amount of confusion about radio propagation when it is applied to a wireless data communications network. Several terms that are commonly used when referring to coverage problems with wireless communications systems are fringe areas and RF dead zones. Fringe areas refer to the areas that are on the "edge" of the radio coverage areas. Radio waves do not abruptly stop at the coverage boundaries, but instead, the strength of the radio waves continuously diminishes as the number of obstacles and the distance from the transmitter is increased, as shown in FIG. 2. So as one moves farther away from the coverage area, the signal intensity decreases and the probability of reception likewise decreases. Unlike fringe areas, RF dead zones may occur within the coverage area boundaries. RF dead zones are areas in which communications between a subscriber unit and the network are not possible. The size of an RF dead zone can vary from a few square feet to many city blocks (in some rare instances). RF dead zones are caused by either insufficient signal level (too high a path loss) or too high a noise level in a particular area. RF dead zones are a normal phenomenon and can be expected to occur throughout a coverage area.

The following is a summary of some of the factors that are known to impact data delivery in fringe areas or may cause RF dead zones. Most of these factors obstruct the electromagnetic waves in the atmosphere. The more obstacles it encounters, the weaker the signal will be when it reaches the receiver. The following factors are some of the more significant losses that impede wireless communications and radio propagation.

Signal reflections and the resulting simultaneous reception of multiple signals is the largest obstacle to successful radio communications. This phenomenon is referred to as multi-path reception and is present in virtually every radio system. When a signal is transmitted, an obstacle may absorb or reflect it. In general, the amount of signal absorption or reflection that occurs is dependent upon the type of obstacle encountered and the frequency of the signal. In an urban environment, the signal that arrives at the base station antenna is made up of hundreds of different signals that have all traversed different paths. In virtually every instance, they add up out of phase and have the effect of canceling each other. As these paths are constantly changing, the resultant composite signal level present at the receiver's antenna is also constantly changing. Moving the receiver's antenna by just a few inches can dramatically alter the composite received signal level.

Terrain variations cause shadowing of radio waves just as they can shadow the sun's rays. As terrain variations become more abrupt, so do their effects on radio reception. Radio waves do fill-in behind obstacles, just as there is some light behind an object that is shadowed by the sun. The signal strength in a shadowed area is determined by taking the shadow loss into account. Man-made obstacles such as buildings and bridges make much more abrupt changes than natural obstacles such as hills, valleys, and trees. Because of these abrupt changes, more shadow loss occurs in and around buildings, making radio coverage more difficult.

Another real world propagation variation is atmospheric bending of the radio wave. In space, radio waves travel in straight lines. However, because of the earth's atmosphere and its changing properties that vary with height, radio waves tend to follow the curvature of the earth. Changing atmospheric conditions such as heavy rain or temperature fluctuations can change radio signal characteristics.

The presence of noise, such as signal and electrical noise, can also dramatically affect the ability of a receiver to pick up a signal. Receivers can have a certain sensitivity when measured in a laboratory environment, but they have diminished effective sensitivity when used in the outside environment. When other signals that are near or on the same frequency are present, radio receivers have a more difficult time selecting the desired signal. These other signals could be caused by atmospheric conditions or man-made devices. Power lines, computers, vehicle electrical systems, and neon lights are just a few of the many noise sources that can interfere with a receiver's ability to hear a signal. These noise sources can be local to the receiver or may propagate great distances. Just as the desired signal can travel many paths, noise sources can also travel these paths. The end result is that a radio receiver can be subjected to widely varying noise signals at the same time that it is subjected to widely varying desired signals.

Another limitation in the prior art is that conventional wireless communication systems use a fixed data packet size to transfer data. This use of a fixed packet size has several disadvantages. First, it is desirable to transfer data using the largest packet size possible to increase efficiency and to reduce cost. However, in a traditional system using a fixed packet size, the system may not be transferring data at the largest packet size available on the system, thus resulting in an inefficient and more costly transfer of data. At the same time, it is also desirable that the data be successfully transferred. If the system is attempting to transfer data at a relatively large packet size, then the packet having a fixed packet size may not be successfully delivered due to some of the factors known to affect data delivery discussed above, such as system limitations, the nature of the RF signal, or environmental conditions. Again, this fixed packet size leads to inefficiencies in that multiple attempts may be required to successfully transfer the data or the data may not be delivered at all, thereby resulting in a loss of the application and higher costs to the end user and a loss of potential revenue to the carrier.

Although the art of wireless communication and radio wave propagation is well developed, there remain some problems inherent in this technology, particularly with providing a system and method for ensuring the optimum delivery of data packets over a wireless communication system so that the data is sent efficiently and delivered correctly. Therefore, the need exists for a system and method of dynamic packet sizing that overcomes the drawbacks of the prior art.

SUMMARY OF THE INVENTION

The present invention is directed to a method for improving the delivery of data between a first signal transmitter/receiver device and a second signal transmitter/receiver device. The method comprises the steps of dynamically sizing the data into at least one data packet having a data packet size that is no greater than an operational maximum data packet size capable of being transferred between the first wireless signal transmitter/receiver device and the second wireless signal transmitter/receiver device, and transferring the at least one data packet from the first signal transmitter/receiver device to the second signal transmitter/receiver device until all data has been delivered.

According to one aspect of the present invention, the step of dynamically sizing the data into the at least one data packet further comprises the steps of: determining an operational maximum allowable packet size capable of being transferred between the first signal transmitter/receiver device and the second signal transmitter/receiver device; and setting the data packet size of the at least one data packet to the data packet size no greater than the operational maximum allowable data packet size.

In accordance with an aspect of the present invention, the step of dynamically sizing the data into the at least one data packet further comprises the steps of reading a stored data packet size from a memory at the second signal transmitter/receiver device; determining an operational maximum allowable data packet size; increasing the data packet size and storing it in the memory, if the stored data packet size is less than the operational maximum allowable packet size; decreasing the data packet size and storing it in the memory, if the stored data packet size is greater than the operational maximum allowable packet size; and packaging the data into at least one data packet, each data packet having the data packet size.

In accordance with a further aspect of the present invention, the step of transferring further comprises the steps of transmitting the at least one data packet, and receiving the at least one data packet between the first signal transmitter/receiver device and the second signal transmitter/receiver device.

In accordance with a further aspect of the present invention, the step of reading the packet size further comprises the steps of sending a request signal from the first signal transmitter/receiver device to the second signal transmitter/receiver device for the second transmitter/receiver device to read a stored packet size from a memory of the second transmitter/receiver device, and reading the stored data packet size.

In accordance with a further aspect of the present invention, the step of determining an operational maximum allowable packet size further comprises the steps of transmitting a signal having the stored data packet size between the first signal transmitter/receiver device and the second signal transmitter/receiver device, determining whether the data packet is successfully transferred, and sizing the data packet size by increasing or decreasing the stored data packet size until a successful transfer of data is determined.

In a further embodiment within the scope of the present invention, a system for improving data packet delivery of wireless communications comprises a first wireless signal transmitter/receiver device having a transmitter, a receiver, a memory, and a microprocessor, the first signal transmitter/receiver device for transmitting a data packet; a second wireless signal transmitter/receiver device having a transmitter, a receiver, a memory, and a microprocessor, the second signal transmitter/receiver device for receiving the data packet; and means for dynamically sizing a data packet for improving data packet delivery between the first signal transmitter/receiver device and the second signal transmitter/receiver device.

According to further aspects of the present invention, the means for dynamic packet sizing further comprises means for dynamically segmenting data and encapsulating the segmented data into at least one data packet having a data packet size that is an operational maximum data packet size. The operational maximum data packet size is a data packet size substantially close to and not greater than a maximum data packet size capable of being successfully transferred between the first signal transmitter/receiver device and the second signal transmitter/receiver device.

Another embodiment within the scope of this invention includes a system for improving data packet delivery of wireless communications between a first signal transmitter/receiver device and a second signal transmitter/receiver device, comprising means for reading a stored data packet size; means for determining an operational maximum data packet size; means for increasing and storing the data packet size if the stored data packet size is less than the operational maximum data packet size; means for decreasing and storing the data packet size if the stored data packet size is greater than the operational maximum data packet size; means for packaging data into at least one data packet having the operational maximum data packet size; means for transmitting the data packet between the first signal transmitter/receiver device and the second signal transmitter/receiver device; and means for receiving the data packet between the first signal transmitter/receiver device and the second signal transmitter/receiver device.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF EXEMPLARY EMBODIMENTS AND BEST MODE

A system and method for improving data packet delivery of wireless communications that solves the above-mentioned problems in the prior art and provides other beneficial features in accordance with the presently preferred exemplary embodiment of the invention will be described below with reference to FIGS. 3–8. The present invention is directed to a method and system for improving data package delivery of wireless communications through dynamic packet sizing (DPS). Those skilled in the art will readily appreciate that the description given herein with respect to those figures is for explanatory purposes only and is not intended in any way to limit the scope of the invention. Throughout the following detailed description similar reference numbers refer to similar elements in all the figures of the drawings.

Figure 1:
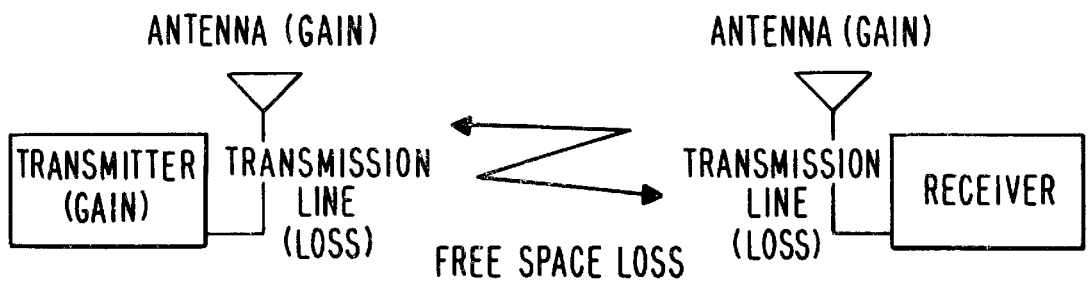
FIG. 1 (prior art) is a block diagram showing how a transmitter and receiver desirably compensate for loss of signal strength in free space.
Figure 2:
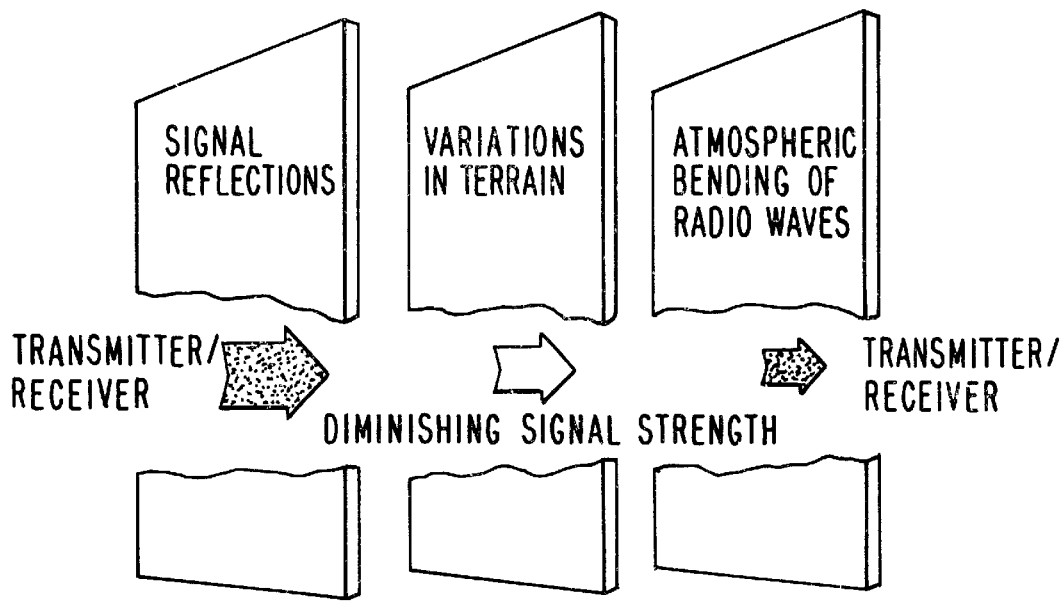
FIG. 2 (prior art) is a block diagram showing how signal strength may be diminished by various obstructions.
Figure 3:
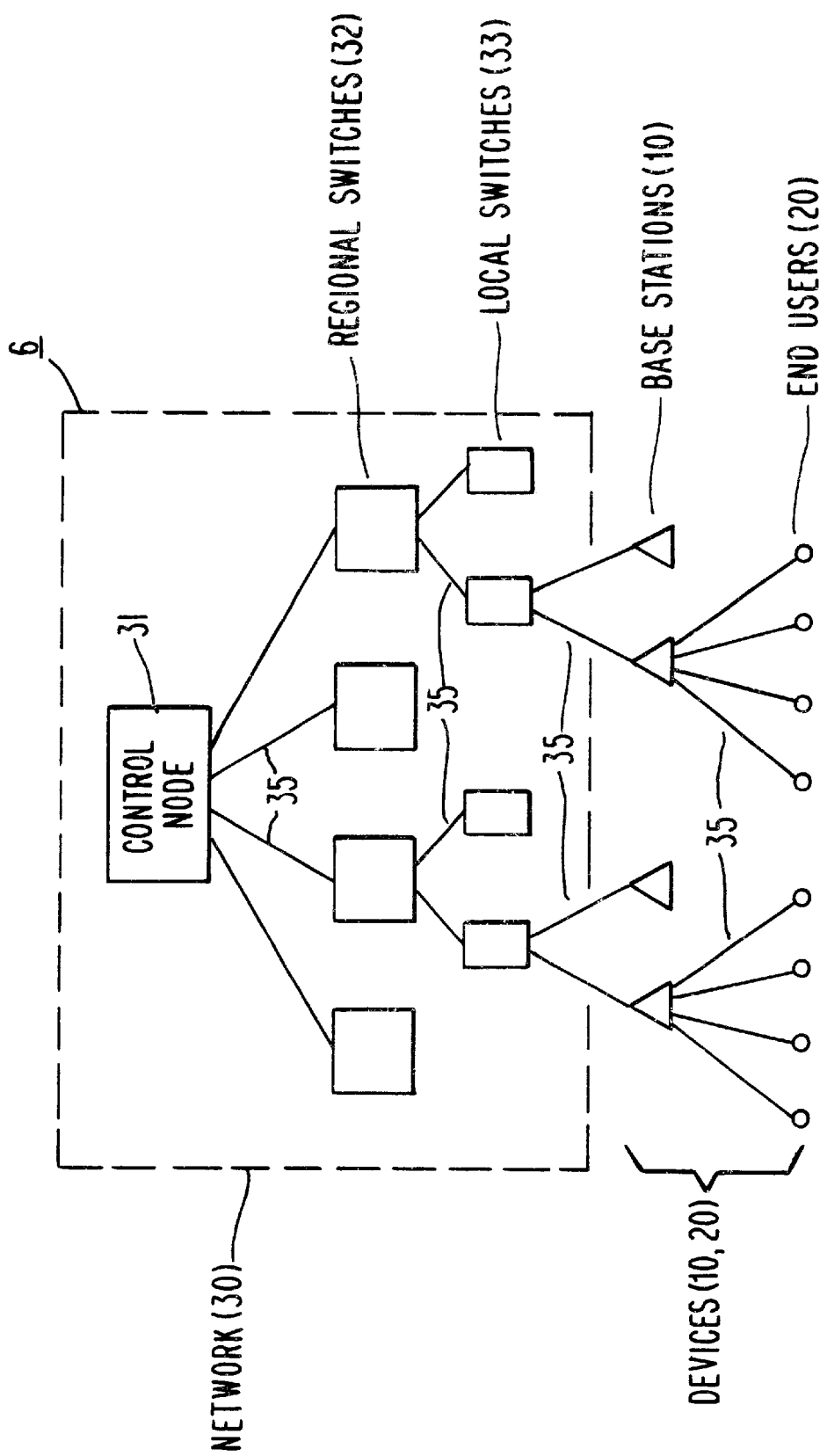
FIG. 3 is a block diagram of an exemplary system of the present invention.

FIG. 3 shows an exemplary system 6 of the present invention for improving data packet delivery of wireless communications. The system 6 comprises a network 30, wireless signal transmitter/receiver devices 10 and 20, a connection 35 between the devices and switches, and an application for dynamically sizing a data packet 60. Preferably, the application comprises a dynamic packet sizer 40.

The system of the present invention preferably comprises conventional RF and wireless devices 10 and 20 and fully complies with Federal Communication Commission (FCC) requirements. However, it is contemplated that the invention is applicable to other types of systems and methods as well, and could be used in any wireless device that uses data packets, and is not limited to the particular system and method embodiments shown. For example, the invention contemplates the use of other dynamic adjusting means, different methods of electronically sizing various packets together, and the use of general purpose computers using software, or exclusively using special purpose hardware, or in a combination of the two for the dynamic sizing of a packet. It is also contemplated that the present invention would be applicable to any wireless application that transmits data back to a base station.

The network 30 provides the connection between the end users 10, 20 and/or between end users and a centralized host/server 31. The network 30 preferably comprises an open systems architecture for wireless mobile data communications, and is capable of supporting wireless Internet and wireless IP mobile data applications. Preferably, the network 30 is also compatible with conventional wireless communication equipment, such as signal transmitter devices comprising regional switches 32 and local switches 33, signal receiver devices 10, 20, wireless modems 20, terminals 20, applications software 40, etc. Communications over the network 30 preferably follows the Open System Interconnection (OSI) model, as is known by those skilled in the art. A benefit of this type of network is that the open, non-proprietary protocol of the network means a greater number of hardware, software and middleware users can tailor individual products to meet changing needs, thereby providing more options for end-users.

The network 30 is preferably optimized for the specific demands of data communications using data packets. This allows end-users to convey time-critical information efficiently and cost effectively. Also, end-users are billed only for successfully transmitted packets. The network 30 preferably operates at a high data rate over the air, such as 19,200 bits per second (bps) and utilizes efficient addressing, automatic repeat request, and forward error correction to maximize throughput. This allows end-users to increase data packet delivery by transmitting short bursts of data over the network, not lengthy files or graphics, where speed is not an issue.

The network coverage area preferably provides for transparent, seamless roaming nationwide or worldwide. The network is preferably capable of providing links to other technologies, such as cellular, dial-up (PSTN), paging and satellite. It is preferred that the network is transparent meaning that no manual intervention is required by the subscriber, and the modem automatically registers with the network. Coverage is preferably seamless in that the network always knows exactly with which base station the mobile device is "in touch." The network is preferably compatible with the wireless modems have frequency agility capability which enables the modems to operate on different network frequencies thereby allowing the device to "roam" from one network base station to the other automatically as they locate the best available channel. This allows the end-user to simply turn on their modems and send or receive their messages. End-users do not have to worry about re-registering with the network as they move from city to city. The sender of a message does not need to know the location of the end user to assure delivery of the data packets.

The network should have sufficient radio frequency pairs (transmitting and receiving) available at numerous base stations with overlapping coverage areas. The networks preferably support multiple trunked radio frequencies at each base station to ensure immediate channel availability. The number of channels at each base station can be increased as necessary to accommodate increased customer volume.

Each base station 10 in the network 30 switches the traffic among mobile terminals 20 within the coverage area of that base station 10. Preferably, no messages are sent higher in the system hierarchy than necessary for effective communications. Each mobile unit 20 constantly monitors the quality of signal reception from the surrounding base stations 10 and maintains communications only with the most suitable, automatically registering with a new base station 10 when entering a different coverage area. Information concerning the location of each mobile unit 20 is relayed to higher network nodes 10, 33, 32, 31. This allows inbound and outbound data packets to traverse the network 30 without switching to higher level nodes, and the roaming feature in the network 30 is preferably initiated by the end user's mobile device 20. This allows the wireless modem device 20 to scan all the neighboring base station sites 10 and maintain a connection with the strongest base station 10. Alternatively, inbound messages (mobile-to-host computer) may be routed through the network's hub computer, and the base stations may be polled to transmit outbound messages to a roaming mobile unit.

The network 30 may also automatically return an optional positive acknowledgment to the sender when a message is delivered to its destination. The sender is informed that the message has been received by the intended recipient. The network may also automatically return an optional negative acknowledgment to the message sender if the message is unreliable, as determined by the BER. The sender then knows that the intended recipient has not received the information sent and that it may be necessary to contact the individual by another means.

The network 30 is also preferably capable of providing automatic rerouting of traffic to alternate end user host sites, to a host over a second leased line, or to the same or alternate host. In all cases, the end user generally will have host group addressing and additional fixed terminal subscription(s). The automatic rerouting also allows data packet traffic to be balanced among multiple customer hosts, or among multiple connections to a single host. This feature provides protection to the customer from equipment and communications failures or natural disasters which may disable a host system. Automatic routing allows the end user's wireless system to continue to operate seamlessly and without interruption.

Figure 4:
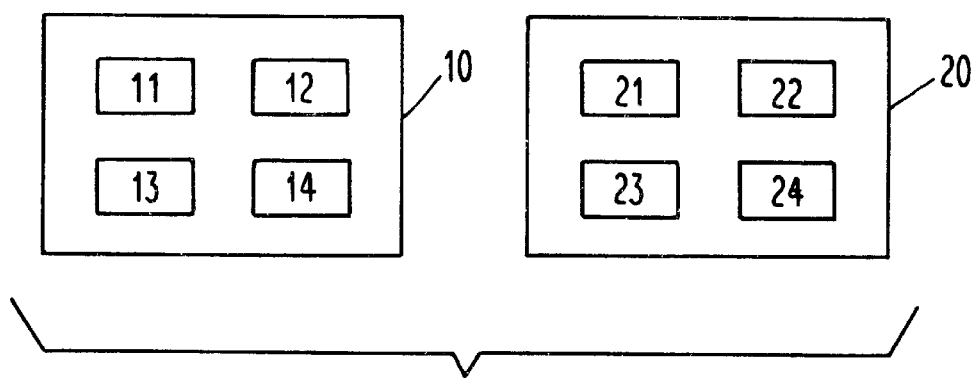
FIG. 4 is a hardware block diagram of an exemplary first signal transmitter/receiver device and an exemplary second signal transmitter/receiver device in accordance with the present invention.

As shown in FIG. 3, the signal transmitter/receiver devices 10, 20 form a data link layer which allows points on the network to talk according to specific protocols. Preferably, wireless modems follow industrial standards and are selected and configured to be compatible with the connectivity means 35 and the network 30. FIG. 4 is a hardware block diagram of an exemplary first signal transmitter/receiver device 10 and an exemplary second signal transmitter/receiver device 20 of the present invention. As shown in FIG. 4, the first signal transmitter/receiver device 10 comprises a transmitter 11, a receiver 12, a microprocessor 13, and a memory 14. The second signal transmitter/receiver device 20 has a transmitter 21, a receiver 22, a microprocessor 23, and a memory 24, such as non-volatile random access memory (NV RAM) for storing the packet size. The second signal transmitter/receiver device further comprises a predetermined or stored packet size of about 15 bytes to about 512 bytes. Preferably, these signal transmitter/receiver devices 10, 20 are compatible with existing network carriers 30, such a ARDIS or Mobitex, existing connectivity means 35, such as X.25 protocol, existing end user applications 40 for wireless communications, and meet FCC requirements.

The connection 35 between a customer host 20 and the network 30 may be provided through a variety of standard data communication protocols, such as UDP/IP, TCP/IP SNA/3270, X.25, Asynch protocols and the MTP/1 transport protocol. This flexibility of various data communication protocols ensures that the network interface is compatible with many end-users' existing applications.

The application 40, shown in FIG. 3, varies depending on the requirements of each end user 20. This component of the wireless communications system 6 is preferably located in the wireless device 20. The application 40 allows the end user device 20 to request or transmit information or data 65 and allows the host/server device 20 to query, update, or confirm information or data 65 on the host side. An example of some preferred applications contemplated by the present invention are home metering, home security, cellular phones, pagers, PDAs, etc.

Figure 5:
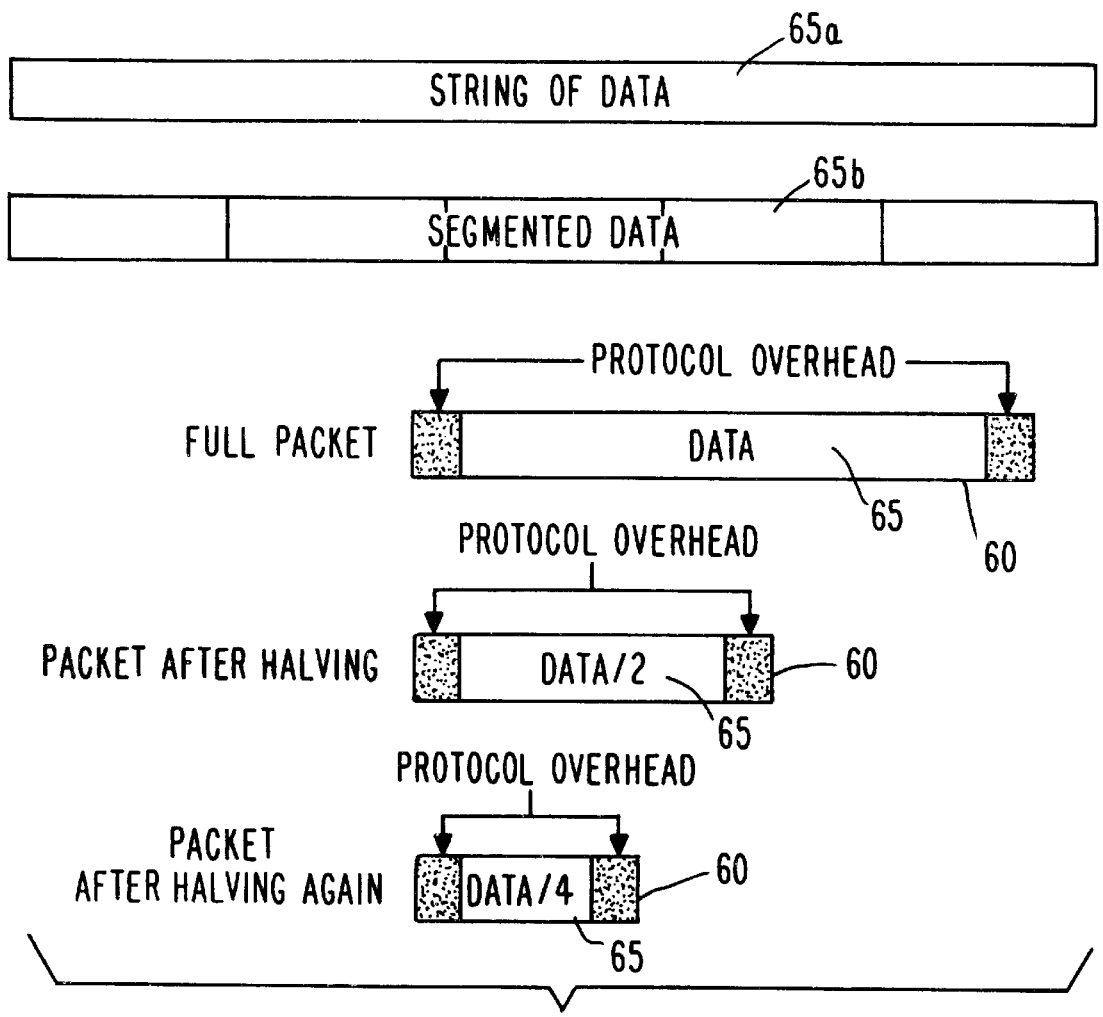
FIG. 5 is a diagram showing an exemplary string of data and several different data packet sizes in accordance with the present invention.

Referring to FIG. 5, it is desirable to transfer a string of data 65a between a first signal transmitter/receiver device 10 and a second signal transmitter/receiver device 20. In order to transfer data 65 in this wireless application between two devices 10 and 20, the data 65 to be transferred is packaged into at least one data packet 60. These data packets are then sent by a first transmitter device 10 as radio waves to a second receiver device 20. The data packets 60 are used in a wireless packet data networks 30, and are similar to cellular networks at a high level; however, the wireless data networks 30 are typically built for data communication, as opposed to voice communications. The present invention preferably segments a string of data 65a and encapsulates the segmented data 65b into individual data packets 60. The actual data 65 to be transferred is broken up into individual data packets 60, such as 240 or 512 bytes long, and then sent over the network.

The dynamic packetization preferably provides extensive error checking and correction features to ensure that the data 65 is communicated correctly across the radio waves. Preferably, multiple devices communicate with the network 30, at the same time, while sharing the same frequency. The data packet 60 has a minimum allowable data packet size 61 and a maximum allowable data packet size 62. Preferably, the data packet size has a minimum allowable data packet size 61 of about 15 bytes and a maximum allowable data packet size 62 of about 512 bytes. It is desirable to transfer data 65 at the maximum data packet size possible to increase efficiency and decrease costs.

Due to various factors, such as system, device, and environmental limitations, it is not always possible to successfully transfer the data having the maximum allowable data packet size 62. However, at all times there is an operational maximum data packet size 63 that may be determined based on the capacities of the system and devices and on the presence of any of the limitations discussed above. It is desirable to transfer the data 65 at a packet size that is as close to, but not greater than, the operational maximum data packet size 63 as possible. Preferably, the data packet 60 is dynamically sized such that the data packet 60 has the largest size possible, while at the same time, the size of the data packet 60 is such as to substantially guarantee successful delivery of the data packets 60. The DPS may be performed at either the first signal transmitter/receiver device (the host or carrier) 10 or at the second signal transmitter/receiver device (the end user or modem) 20.

Figure 6:
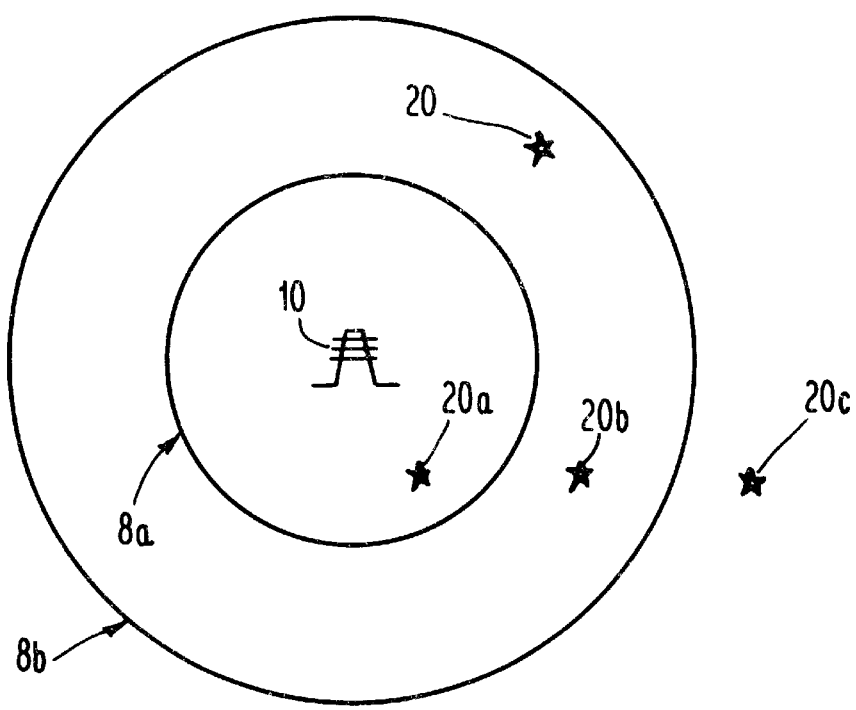
FIG. 6 is a diagram showing a typical coverage area for different signal strengths.

FIG. 6 shows typical effective ranges or coverage area of a wireless communication signal in accordance with the present invention. In FIG. 6, a plurality of signal transmitter/receiver devices 10, 20 are shown for transferring data packets 60 between the various signal transmitter/receiver devices 10, 20. For example, a first signal transmitter/receiver device 10 (also referred to herein as a tower, a base station, and a carrier) is used to transfer data 65 to a second signal transmitter/receiver device 20 (also referred to herein as an end user, a mobile unit, and a modem).

Range line 8a represents a first threshold effective range. A typical intensity for the threshold effective range 8a is about 90 dB. Any end user 20a within this threshold effective range 8a will be substantially guaranteed to successfully receive any data transfer signal sent from the tower 10. The second signal intensity line 8b represents a maximum effective range for data transmission between the tower 10 and an end user 20. A typical intensity for the maximum effective range 8b is about 112 dB. Any end user 20b located between this maximum effective range 8b and the threshold effective range 8a may or may not successfully receive a data transmission from the tower 10. An end user 20c located outside this maximum effective range 8b will likely not receive data 65 transferred from the tower 10.

The threshold effective range 8a and the maximum effective range 8b of the transmitter/receiver devices 10, 20 vary depending on a number of factors, such as the size of the data packet 60, the characteristics of the first and second transmitter/receiver devices 10 and 20, the distance between the transmitter/receiver devices X, signal intensity Y, movement of the second transmitter/receiver device, the network properties and current operation conditions on the network, and environmental conditions. This phenomena creates a situation where the effective range and coverage area for the wireless communications is constantly changing based on the above factors and this may create problems with the efficient and successful transmission of data packets 60 between the wireless communication devices.

The present invention addresses this problem by dynamically sizing the data packet 60 to improve the success rate for the delivery of data 65 between these signal transmitter/receiver devices 10, 20, especially in the range between the threshold effective range 8a and the maximum effective range 8b. DPS increases the efficiency of the data transfer by determining an operational maximum data packet size 63 and sizing the data packets 60 to have a data packet size that approaches and is not greater than the operational maximum data packet size 63.

Preferably, and described in further detail below with respect to FIG. 8, the size of the data packet 60 is increased, more preferably doubled, upon a request between the tower 10 and the end user 20. The data packet size is increased until the data packet size approaches and is not greater than the operational maximum data packet size 63. The transmitting device 20 then attempts to send the data packet 60 to the receiver device 10. If it is successful, then the data transfer continues at this packet size until all data packets 60 are delivered. If the data transfer is unsuccessful, the size of the data packet 60 is decreased, preferably halved, and the data 65 is resent. If the data 65 is still not successfully sent, then the size of the data packet 60 is again decreased. The process of decreasing the packet size continues until either the data packet 60 is successfully transferred, at which time the remaining data packets 60 are sent at this data packet size until all the data 65 has been delivered, or until a minimum allowable data packet size 61 is reached at which time the attempt to transfer the data 65 is ceased, the data 65 is determined to be undeliverable, and the application is terminated. Each time the size of the data packet 60 is decreased, the new decreased data packet size is stored in place of the previously stored data packet size. Preferably, the data packet size is stored in the memory of the device.

The success of the data packet transmission is preferably determined by calculating a BER. The BER is determined by measuring the number of bits 67 that are in error inside the packets 60. In the wireless communication system, packets 60 are preferably sent using a digital modulation scheme with built-in error correction. When a device receives a data packet 60, the receiving device decodes the message, using the inverse of the modulation scheme and calculates a BER. If the BER is low enough, then the device can correct the errors in the packet using a method of built-in error correction, thus making the packet usable. If the BER is too high, the correction methods cannot guarantee that the data 65 received is correct, thus rendering the data packet 60 unusable, and forcing it to be discarded. More preferably, the digital modulation scheme uses a pure ALOHA scheme.

An acceptable BER and successful transfer of data 65 may be indicated by an acknowledge signal, such as the receiver device sending an acknowledgment (ACK) back to the transmitter device. Once the transmitter device receives an ACK from the receiver device or it is otherwise determined that the data packet 60 has been successfully transferred, it will continue sending the remaining data packets 60 at that size packet until it has completed the entire data 65 payload delivery. After all the packets 60 have been sent, the device then waits for another request from the host system.

Figure 7:
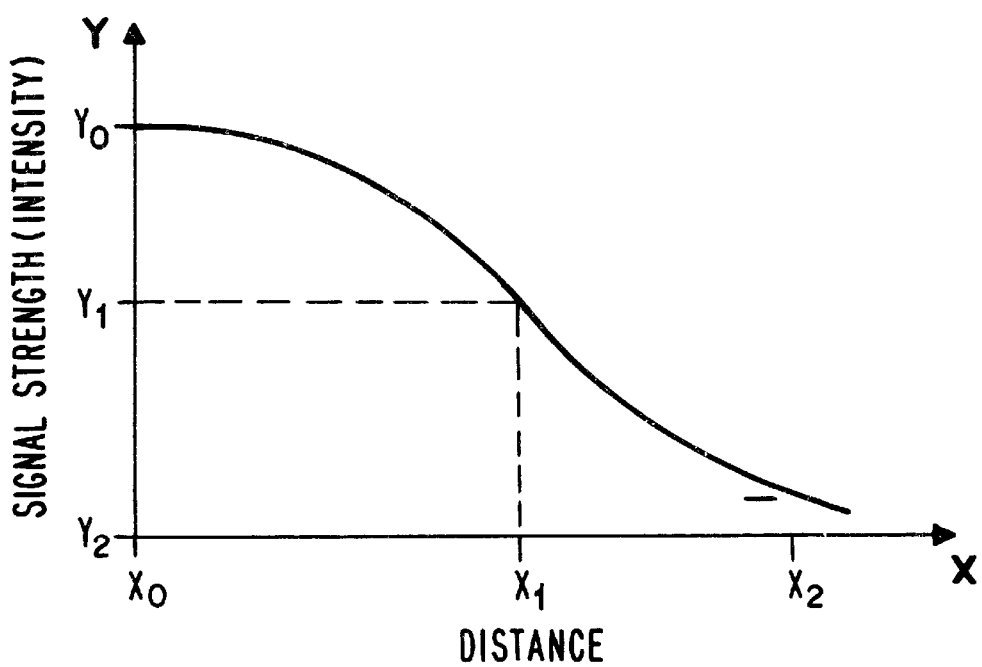
FIG. 7 is a graph showing an exemplary signal intensity versus distance from a signal source (tower)

FIG. 7 is a graph showing signal intensity Y versus distance X between the first signal transmitter/receiver device 10 and the second signal transmitter/receiver device 20. FIG. 7 shows signal intensity Y, represented by the y-axis, varying from a peak intensity $Y_0$, through a threshold intensity $Y_1$, to a minimum intensity $Y_2$ of the signal measured in decibels (dB). The x-axis of FIG. 7 represents the distance between the tower 10 and the end user 20 measured in feet. The point on FIG. 7 marked $X_0, Y_0$ represents the signal intensity (or peak intensity) at the transmitter or tower 10. The signal intensity Y decreases as the distance X from the signal transmitter 10 increases. The point $X_1, Y_1$ represents a threshold signal intensity and distance from the tower. In the range represented by the range and signal intensity from the point $X_0, Y_0$ to the point $X_1, Y_1$ the receipt of the transmitted data 65 is substantially guaranteed. The point $X_2, Y_2$ represents a maximum distance X from the tower 10 after which, the signal Y will not longer be substantially guaranteed to be received. In the range represented by the range and signal intensity from the point $X_1, Y_1$ to the point $X_2, Y_2$ the receipt of the data 65 transmission is uncertain, and the data 65 may or may not be successfully delivered. By use of DPS, the success rate of data transmitted in the range between points $X_1, Y_1$ and $X_2, Y_2$ is improved. The point $X_1, Y_1$ corresponds to the threshold range line 8a of FIG. 6, and the point $X_2, Y_2$ corresponds to the maximum range line 8b of FIG. 6.

Figure 8:
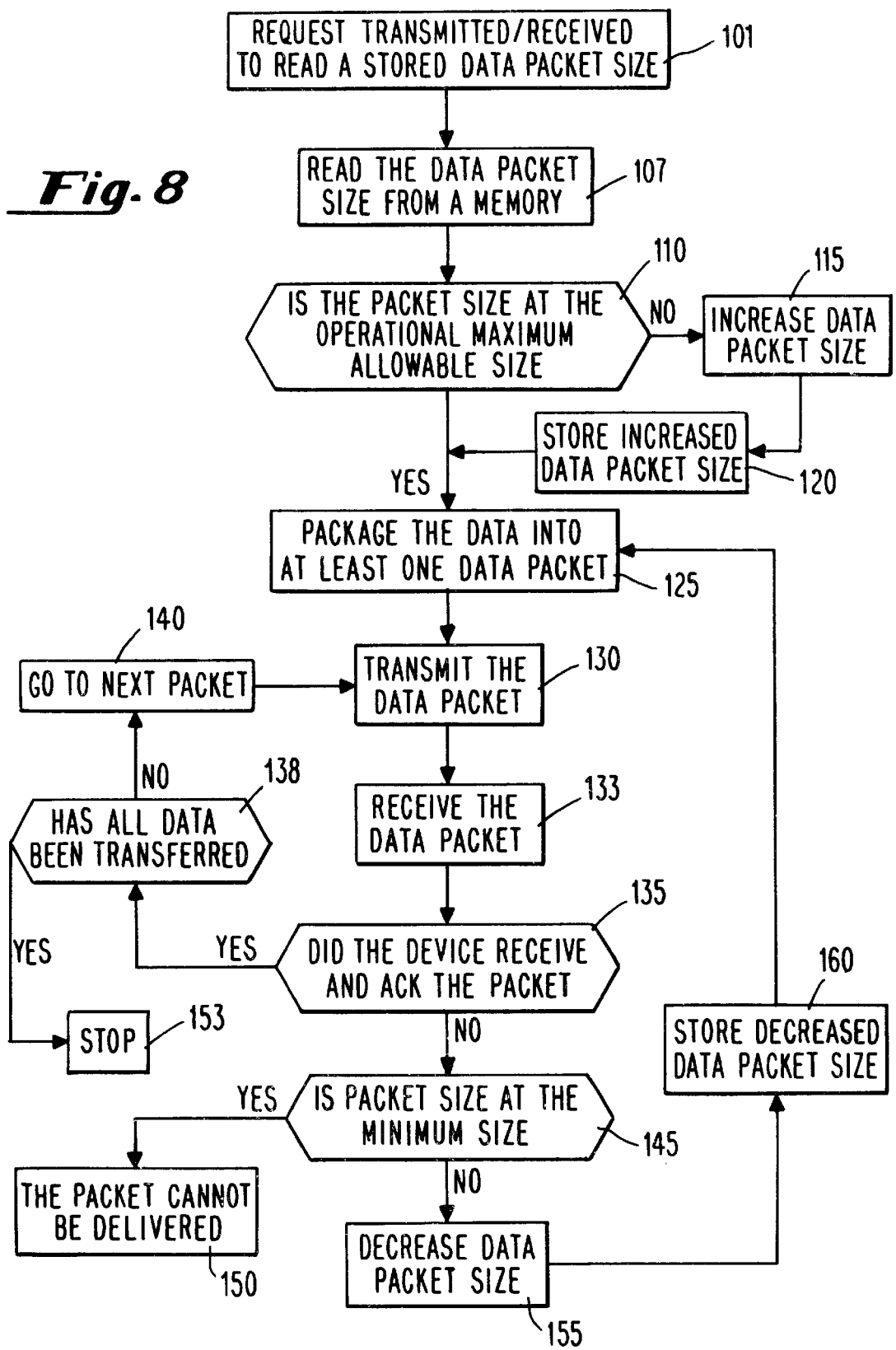
FIG. 8 is a flowchart showing an exemplary method for improving data packet delivery in accordance with the present invention.

FIG. 8 shows an exemplary method of dynamically sizing data 65 into at least one data packet 60 to ensure that the data packet 60 has the largest size possible while at the same time still ensuring successful delivery of the data 65, and transferring each data packet 60 from a transmitter device 10 to a receiver device 20 until all the data 65 has been delivered. The dynamic packet sizing is preferably performed by dynamically adjusting the size of the data packet 60 (i.e., the number of bytes) to be transferred between the transmitter device 10 and receiver device 20. The DPS ensures that data 65 is transferred close to, but not greater than, an operational maximum allowable data packet size 63, while at the same time ensuring that the data package 60 is sized so that the data 65 can be substantially guaranteed to be delivered correctly.

Adjusting the size of the data packet is responsive to various factors, such as the currently stored data packet size, the characteristics of the transmitter and receiver devices, the distance between the transmitter and receiver devices, the network properties and current operation conditions, and environmental conditions. Some of the benefits provided by the present invention include an effective increase the RF coverage for telemetry application, an increase in billable data by the wireless carrier, fewer packet collisions in highly congested areas, and reliable packet data transfer in remote or fringe RF areas.

Once it receives another request, the device will increase the currently stored packet size 64, preferably by doubling the size of the stored data packet size. This increased data packet size is then stored in place of the previously stored data packet size 64, preferably in the memory of the device. This increasing of the data packet size is done for the situations where the RF device is located in a strong coverage area, but at the instant the RF device attempted to transmit the data back to the tower, some type of interference, such as a tractortrailer pulling in front of the device thereby blocking the device from the tower, causes the packet size to be reduced. For that specific data transfer session, it will reduce the packet size enough to get through to the tower, but it is undesirable for the packet size to stay that small from day to day (because it is in a strong coverage area). So, the next time the device is queried from the host, the packet size will be increased. This allows the data packet size to eventually approach or reach the maximum allowable data packet size 62 of the network 30 or the operational maximum packet size 63 possible at that given time taking into account some of the various factors that affect wireless communications previously discussed. FIG. 8 shows how an exemplary DPS method and system work to improve data packet 60 delivery in these situations where the signal is obstructed or is being delivered in an obstructed or fringe area.

Referring to FIG. 8, at step 101, a stored data packet size is requested between one signal transmitter/receiver device 10 and a second signal transmitter/receiver device 20. The second device 20 reads the size of the data packet 60 by reading the stored data packet size 64 in the memory 23 of the second device 20, at step 107. It is then determined at step 110 if the stored data packet size 64 is at an operational maximum allowable packet size 63 is performed.

If the packet is not at the operational maximum allowable packet size 63, the stored data packet size is increased at step 115. The increased data packet size is then stored at step 120. The data is packaged at step 125 into at least one data packet 60 having the increased stored data packet size. The data 65 is then attempted to be transferred at step 130 by transmitting the data packet 60 between the first signal transmitter/receiver device 10 and the second signal transmitter/receiver device 20. The data packet 60 is potentially received by the receiver device 20 at step 133. The transfer of the data packet 60 is verified at step 135 by determining if the data packet 60 was successfully received by the second signal transmitter/receiver device 20. If the data packet 60 is successfully received, then the receiver device 20 sends an acknowledging recite of the data packets 60.

It is determined at step 138 if all the data has been transferred. If all the data packets have been transferred, the device stops transferring data 65 at step 153. If the data packet 60 has been successfully transferred, and all the data has not been transferred, the device goes to the next data packet 60 at step 140 and the remaining data packets 60 are transferred at the same data packet size until all the data 65 has been delivered. If the data packet 60 is not successfully transferred, it is determined at step 145 if the data packet size is at a minimum allowable data packet size 61 is performed. If the packet size is not at the minimum allowable data packet size 61, the data packet size is decreased at step 155. If the data packet is at or below the minimum allowable data packet size 61, the data packet transfer is stopped at step 150. If the data packet 60 is not at the minimum allowable data packet size 61, then the size of the data packet 60 is decreased at step 155, preferably by halving the currently stored data packet size. The decreased packet size stored at step 160. This decreased data packet 60 size is then used to repackage the data 65 at step 125 and the device attempts to re-transmit the data packet 60 at step 130. The data packet size is decreased at step 155 until a data packet 60 is successfully transferred.

When the packet is successfully transferred, the next data packet is retrieved at step 140 and transmitted at step 130. The data packet transferral stops at step 153 when all the data 65 has been delivered or step 150 is initiated when the minimum allowable data packet size 61 is reached.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for improving the delivery of data between a first signal transmitter/receiver device and a second signal transmitter/receiver device, comprising the steps of:

dynamically sizing said data into at least one data packet having a data packet size that is no greater than an operational maximum data packet size capable of being transferred between said first wireless signal transmitter/receiver device and said second wireless signal transmitter/receiver device; and transferring said at least one data packet from said first signal transmitter/receiver device to said second signal transmitter/receiver device until all data has been delivered, wherein said step of dynamically sizing said data into said at least one data packet further comprises the steps of:

reading a stored data packet size from a memory at said second signal transmitter/receiver device;

determining an operational maximum allowable data packet size;

increasing said data packet size and storing it in said memory, if said stored data packet size is less than said operational maximum allowable packet size;

decreasing said data packet size and storing it in said memory, if said stored data packet size is greater than said operational maximum allowable packet size; and packaging said data into at least one data packet, each said at least one data packet having said data packet size.

2. The method of claim 1, wherein the step of dynamically sizing said data into said at least one data packet further comprises the steps of:

determining an operational maximum allowable packet size capable of being transferred between said first signal transmitter/receiver device and said second signal transmitter/receiver device; and setting said data packet size of said at least one data packet to said data packet size no greater than said operational maximum allowable data packet size.

3. The method of claim 2, wherein said step of determining an operational maximum allowable packet size further comprises the steps of transmitting a signal having said stored data packet size between said first signal transmitter/receiver device and said second signal transmitter/receiver device, determining whether said data packet is successfully transferred, and sizing said data packet size by increasing or decreasing said stored data-packet size until a successful transfer of data is determined.

4. The method of claim 3, wherein said step of determining whether said data packet is successfully transferred further comprises the step of performing a calculation of a Bit Error Rate (BER) of said transferred data packet, and determining if said calculated BER is within an acceptable BER.

5. The method of claim 1, wherein said step of increasing said stored packet size further comprises doubling the size of said stored data packet size.

6. The method of claim 1, wherein said step of decreasing said data packet size further comprises halving said stored data packet size.

7. The method of claim 1, wherein said step of transferring further comprises the steps of transmitting said at least one data packet, and receiving said at least one data packet between said first signal transmitter/receiver device and said second signal transmitter/receiver device.

8. The method of claim 7, wherein said step of transmitting further comprises the step of transmitting said data packet over a conventional open system architecture network.

9. The method of claim 8, wherein said conventional network further comprises an ARDIS two-way, wireless data communication system.

10. The method of claim 7, wherein said step of transmitting said data packet further comprises the step of digitally modulating said data packet.

11. The method of claim 10, wherein said step of digitally modulating said data packet further comprises using a pure ALOHA scheme of digital modulation.

12. The method of claim 7, wherein said step of transmitting said data packet further comprises using one of X.25 PTP protocol and asynchronously.

13. The method of claim 7, wherein said step of receiving said at least one data packet further comprises the steps of performing the inverse of said digital modulation scheme, calculating a bit error rate (BER) for said received data packet, and determining if said calculated BER is within a predetermined acceptable BER.

14. The method of claim 1, wherein said step of reading said packet size further comprises the steps of sending a request signal from said first signal transmitter/receiver device to said second signal transmitter/receiver device for said second transmitter/receiver device to read a stored packet size from a memory of said second transmitter/receiver device, and reading said stored data packet size.

15. The method of claim 1, wherein said step of packaging data into at least one data packet further comprises the steps of segmenting a string of data and encapsulating said segmented data into at least one data packet having said operational maximum allowable data packet size.

16. The method of claim 1, wherein said step of storing said increased packet size and said decreased data packet size further comprises storing said data packet size in said memory of said second signal transmitter/receiver device.

17. A system for improving data packet delivery of wireless communications, comprising:
  a first wireless signal transmitter/receiver device having a transmitter, a receiver, a memory, and a microprocessor, said first signal transmitter/receiver device for transmitting a data packet;
  a second wireless signal transmitter/receiver device having a transmitter, a receiver, a memory, and a microprocessor, said second signal transmitter/receiver device for receiving said data packet; and
  means for dynamically sizing a data packet for improving data packet delivery between said first signal transmitter/receiver device and said second signal transmitter/receiver device, said means comprising:
    a reader for reading a stored data packet size from a memory at said second signal transmitter/receiver device;
    a processor for determining an operational maximum allowable data packet size and,
      increasing said data packet size and storing it in said memory, if said stored data packet size is less than said operational maximum allowable packet size, and
      decreasing said data packet size and storing it in said memory, if said stored data packet size is greater than said operational maximum allowable packet size; and
    a packager for packaging said data into at least one data packet, each said at least one data packet having said data packet size.

18. The system of claim 17, wherein said first signal transmitter/receiver device further comprises one of a base station, a network carrier, and a tower.

19. The system of claim 17, wherein said second signal transmitter/receiver device further comprises one of a RF device, a modem, or an end-user.

20. The system of claim 17, wherein said means for dynamic packet sizing further comprises means for dynamically segmenting data and encapsulating said segmented data into at least one data packet having a data packet size that is an operational maximum data packet size.

21. The system of claim 20, wherein said operational maximum data packet size is a data packet size substantially close to and not greater than a maximum data packet size capable of being successfully transferred between said first signal transmitter/receiver device and said second signal transmitter/receiver device.

22. The system of claim 17, wherein said data packet has a size in the range between about 15 bytes and about 512 bytes.

23. A system for improving data packet delivery of wireless communications between a first signal transmitter/receiver device and a second signal transmitter/receiver device, comprising:
  means for reading a stored data packet size;
  means for determining an operational maximum data packet size;
  means for increasing and storing said data packet size if said stored data packet size is less than said operational maximum data packet size;
  means for decreasing and storing said data packet size if said stored data packet size is greater than said operational maximum data packet size;
  means for packaging data into at least one data packet having said operational maximum data packet size;
  means for transmitting said data packet between said first signal transmitter/receiver device and said second signal transmitter/receiver device; and
  means for receiving said data packet between said first signal transmitter/receiver device and said second signal transmitter/receiver device.

24. The system of claim 23, wherein said means for reading a stored data packet size further comprises means for reading a stored data packet size from a memory of said second signal transmitter/receiver device.

25. The system of claim 23, wherein said means for determining an operational maximum allowable packet size further comprises means for transmitting a signal having a predetermined data packet size between said first signal transmitter/receiver device and said second signal transmitter/receiver device, means for determining whether said data packet is successfully transferred, and means for dynamically sizing said data packet by increasing or decreasing said data packet size until said data packet is successfully transferred.

26. The system of claim 25, wherein said means for determining whether said data packet is successfully transferred further comprises means for calculating a Bit Error Rate (BER), means for determining if said calculated BER is within an acceptable BER, and means for sending an acknowledgment signal, if said calculated BER is acceptable.

27. The system of claim 23, wherein said means for increasing said data packet size further comprises means for doubling the size of said stored data packet size and said means for storing said data packet size further comprises means for storing said increased data packet size in said memory of said second signal transmitter/receiver device.

28. The system of claim 27, wherein said increased packet size and said decreased data packet size is stored in said memory.

29. The system of claim 23, wherein said decreasing means further comprises means for halving said stored data packet size, and said storing means for storing said decreased packet size further comprises means for storing said halved data packet size in said memory of said second device.

30. The system of claim 23, wherein said packaging means further comprises means for segmenting the data, and encapsulating said segmented data into at least one data packet having said operational maximum data packet size.

31. The system of claim 23, wherein said transmitting means further comprises a transmitter using a digital modulation scheme with built-in error correction.

32. The system of claim 31, wherein said digital modulation scheme comprises a pure ALOHA scheme.

33. The system of claim 31, wherein said transmitting means further comprises one of X.25 PTP protocol and asynchronously.

34. The system of claim 23, wherein said receiving means further comprises a receiver for receiving an RF signal containing said data packets, means for assembling said individual data packets, and means for determining if said data packet was successfully received.

35. The system of claim 34, wherein said means for assembling said at least one data packet further comprises means for performing the inverse of said digital modulation scheme with built-in error correction, and said means for determining if said data packet was successfully received further comprises means for determining a bit error rate (BER) for said received data packet and comparing it to a predetermined acceptable BER.

36. A system for improving data packet delivery of wireless communications, comprising:
a network;
a plurality of wireless transmitter/receiver devices;
a connectivity means between said network and said wireless transmitter/receiver devices; and
a dynamic packet sizer,
wherein said connectivity means comprises a standard data communication protocol,
wherein said connectivity means further comprises one of UDP/IP, TCP/IP SNA/3270, X.25, Asynch protocols and the MTP/1 transport protocol.

37. A method of increasing the RF coverage for telemetry wireless communications, comprising the steps of:
providing a plurality of RF devices;
dynamically sizing at least one data packet using dynamic packet sizing;
wherein the step of dynamically sizing at least one data packet further comprises:
increasing a stored data packet size;
decreasing said stored data packet size if said data packet cannot be successfully delivered; and
transferring said at least one data packet between said plurality of RF devices.

38. A method for improving the delivery of data between a first signal transmitter/receiver device and a second signal transmitter/receiver device, comprising the steps of:
dynamically sizing said data into at least one data packet having a data packet size that is no greater than an operational maximum data packet size capable of being transferred between said first wireless signal transmitter/receiver device and said second wireless signal transmitter/receiver device;
determining an operational maximum allowable packet size capable of being transferred between said first signal transmitter/receiver device and said second signal transmitter/receiver device; and
wherein said step of determining an operational maximum allowable packet size further comprises the steps of transmitting a signal having said stored data packet size between said first signal transmitter/receiver device and said second signal transmitter/receiver device, determining whether said data packet is successfully transferred, and sizing said data packet size by increasing or decreasing said stored data packet size until a successful transfer of data is determined;
setting said data packet size of said at least one data packet to said data packet size no greater than said operational maximum allowable data packet size; and
transferring said at least one data packet from said first signal transmitter/receiver device to said second signal transmitter/receiver device until all data has been delivered.

* * * * *

UNITED STATES PATENT AND TRADEMARK OFFICE
CERTIFICATE OF CORRECTION

PATENT NO. : 6,700,902 B1
DATED : March 2, 2004
INVENTOR(S) : Peter Ronald Meyer It is certified that error appears in the above-identified patent and that said Letters Patent is hereby corrected as shown below:

<u>Title page,</u>
Item [56], References Cited, U.S. PATENT DOCUMENTS, delete "7/1985" and insert -- 6/1985 --;

<u>Column 2,</u>
Line 5, delete "T" and insert -- τ --.

Signed and Sealed this

Twentieth Day of July, 2004

JON W. DUDAS
*Acting Director of the United States Patent and Trademark Office*